United States Patent
Gimeno Monge et al.

(10) Patent No.: US 9,202,158 B2
(45) Date of Patent: Dec. 1, 2015

(54) SECURE ELEMENT POWER MANAGEMENT SYSTEM

(71) Applicant: ST-Ericsson SA, Plan-les-Ouates (CH)

(72) Inventors: Pablo Ignacio Gimeno Monge, Nice (FR); Javier Del Prado Pavon, Antibes (FR); Nikhil Taluja, Southlake, TX (US)

(73) Assignee: ST-ERICSSON SA, Plan-Les-Ouates (CH)

( * ) Notice: Subject to any disclaimer, the term of this patent is extended or adjusted under 35 U.S.C. 154(b) by 0 days.

(21) Appl. No.: 14/405,216

(22) PCT Filed: Jun. 19, 2013

(86) PCT No.: PCT/EP2013/062800
§ 371 (c)(1),
(2) Date: Dec. 3, 2014

(87) PCT Pub. No.: WO2013/190010
PCT Pub. Date: Dec. 27, 2013

(65) Prior Publication Data
US 2015/0108225 A1  Apr. 23, 2015

Related U.S. Application Data

(60) Provisional application No. 61/666,026, filed on Jun. 29, 2012.

(30) Foreign Application Priority Data

Jun. 21, 2012  (EP) .................................... 12305715

(51) Int. Cl.
*G06K 19/06* (2006.01)
*G06K 19/07* (2006.01)
*H02J 9/06* (2006.01)

(52) U.S. Cl.
CPC ........ *G06K 19/0703* (2013.01); *G06K 19/0702* (2013.01); *G06K 19/0712* (2013.01); *G06K 19/0715* (2013.01); *G06K 19/0727* (2013.01); *H02J 9/061* (2013.01)

(58) Field of Classification Search
CPC ....... G06K 19/073; G06K 7/08; G06K 19/00; G06K 19/06; G06K 5/00; G06K 19/067; G06K 19/077
USPC .......................... 235/492, 380, 451, 487, 375
See application file for complete search history.

(56) References Cited

U.S. PATENT DOCUMENTS 5,138,142 A * 8/1992 Sanemitsu .................... 235/492
8,833,666 B2 * 9/2014 Kargl ............................ 235/492

(Continued)

FOREIGN PATENT DOCUMENTS

EP  1 280 099 A1  1/2003
FR  2 888 974 A1  1/2007

OTHER PUBLICATIONS

International Search Report issued in corresponding International application No. PCT/EP2013/062800, date of mailing Oct. 4, 2013.

(Continued)

*Primary Examiner* — Edwyn Labaze
(74) *Attorney, Agent, or Firm* — Patent Portfolio Builders PLLC

(57) ABSTRACT

There is described a method of, and a circuit for supplying power to an integrated circuit card, ICC, of a wireless device comprising a first power supply unit. The circuit comprises a power pin connected configured to selectively operate as a power input pin or as a power output pin, and adapted to be connected to the first power path of the device through a second power path of the device; a second power supply unit; and a controller configured to cause the power pin to operate as a power input pin in the first operation mode of the device, or as a power output pin in the second operation mode of the device. A wireless device comprising the circuit and a method of supplying power to an ICC are further disclosed.

7 Claims, 4 Drawing Sheets

(56) References Cited

U.S. PATENT DOCUMENTS

| | | | |
|---|---|---|---|
| 2002/0066793 A1* | 6/2002 | Hayashi | 235/492 |
| 2003/0086278 A1* | 5/2003 | Asami | 363/13 |
| 2006/0186211 A1* | 8/2006 | Kim et al. | 235/492 |
| 2009/0057417 A1* | 3/2009 | Shinohara et al. | 235/492 |
| 2010/0088534 A1* | 4/2010 | Watanabe et al. | 713/340 |
| 2013/0238910 A1* | 9/2013 | Liu et al. | 713/300 |

OTHER PUBLICATIONS

Written Opinion of the International Searching Authority issued in corresponding International application No. PCT/EP2013/062800, date of mailing Oct. 4, 2013.

Extended European Search Report issued in corresponding European application no. EP 12 30 5715, date of completion of the search, Nov. 13, 2012.

\* cited by examiner

SECURE ELEMENT POWER MANAGEMENT SYSTEM

TECHNICAL FIELD

The present disclosure relates to wireless communications and, more particularly, to the power management of a secure element of a wireless device. It finds applications, for instance, in wireless devices such as smart phones or digital tablets.

BACKGROUND

Needs for efficient power management of wireless devices have proliferated exponentially with the increasing demand for power consuming features in wireless, battery powered products. In fact, wireless devices functionalities have increased enormously and not only for making phone calls, but also for performing applications like capturing images, watching videos, surfing over the Internet, sending and receiving emails, listening to music or enjoying other entertainments, using geo-localisation based tools, etc. Such features stretch the boundaries of power available in a wireless device.

Near Field Communication (NFC) technology offers a wide range of features in demand for wireless devices. NFC is a short range communication technology that allows a portable, e.g. wireless device to emulate both a contactless tag and a contactless reader. It provides an easy way for users to interact with their environment. NFC is currently seen as an enabling technology for a number of applications such as mobile payment and public transportation ticketing, for instance.

In secure NFC applications, in a wireless device, a Universal Integrated Circuit Card (UICC), containing applications such as a SIM (Subscriber Identity Module) card, USIM (Universal Subscriber Identity Module) card or ISIM (IP Multimedia Services Identity Module), is utilised as a Secure Element (SE) to hold sensitive information securely. Such sensitive information may include, for instance, credit card numbers and transportation system subscription data.

NFC platforms readily available on the market feature an existing UICC power supply system, which however is not designed to serve the specific needs of the SE. In fact, unlike UICC applications, NFC secure applications are designed so as be able to run even when the wireless device is in a battery-Off mode of operation wherein, for instance, the battery of the mobile phone is discharged or dismounted.

As the battery-Off mode is an optional mode of operation, this requirement of NFC secure application is not adequately addressed by state of the art UICC power supply, and no proper solutions are currently available.

SUMMARY

The above problems may be overcome by enabling the supply of power to a universal integrated circuit card (UICC) being in a battery-Off mode, by using power from a circuit with a single connection from the circuit to the legacy power path of the UICC.

A first aspect of the proposed solution relates to a circuit for supplying power to an integrated circuit card (ICC) of a wireless device comprising a first power supply unit adapted to supply power to the ICC through a first power path in a first operation mode of the device while being unable to supply power to the ICC in a second operation mode of the device. The circuit comprises:
 a second power supply unit;
 a power pin connected to the second power supply unit and configured to selectively operate as a power input pin or as a power output pin, and adapted to be selectively connected to the first power supply unit of the device through a second power path of the device or to the ICC trough a third power path of the device, respectively;
 a controller configured to cause the power pin to operate as a power input pin in the first operation mode of the device whereby the second power supply unit is loaded with power from the first power supply unit through the power pin and the second power path of the device, or as a power output pin in the second operation mode of the device whereby power is supplied to the ICC from the second power supply unit through the power pin and the third power path of the device.

A second aspect relates to a method of supplying power to an integrated circuit card (ICC) of a wireless device comprising a first power supply unit. The method comprises:
 in a first operation mode of the device, supplying power to the ICC from the first power supply unit through a first power path coupling the first power supply unit to the ICC, and loading power from the first power supply unit into a second power supply unit through a second power path; or, selectively,
 in a second operation mode of the device wherein the first power supply unit is unable to supply power to the ICC, supplying power to the ICC from the second power supply unit through a third power path of the device coupling the second power supply unit to the ICC.

A third aspect relates to a first power supply unit comprising:
 a power pin adapted to withstand input current flows without suffering damage.

A fourth aspect relates to a wireless device comprising:
 an integrated circuit card (ICC);
 a first power supply unit adapted to supply power to the ICC through a first power path in a first operation mode of the device while being unable to supply power to the ICC in a second operation mode of the device; and,
 a circuit as defined in the first aspect of the proposed solution, adapted to supply power to the ICC in the second mode of operation.

Thus, in a wireless device embodying the principles of such mechanism, weakness of state of the art mechanism related to UICC power supply for NFC application in battery-Off mode is overcome by enabling the supply of power to a universal integrated circuit card (UICC) containing an application such as an NFC SE, while being in a battery-Off mode using power from an integrated circuit with a single connection from the circuit to the legacy power path of UICC.

This helps easily integrating such mechanism to existing UICC power supply system since no modification of legacy power system is required.

Furthermore, this mechanism does not jeopardise the compliance with specification requirements of UICC power supply since no voltage drop is experienced in this configuration.

In one embodiment, the circuit further comprises a control output pin connected to the controller and adapted to be connected to a circuit breaking unit of the device located in the first power path between the first power supply unit and a connection point between the first power path on one side, and the second and third power path on the other side.

In this embodiment the controller is configured to control the opening of the circuit breaking unit through the control pin so as to prevent back current flow from the second power unit to the first power supply unit in the second operation mode of the device.

This realisation consider the potential damage that may be caused by the ICC being supplied in power by the second source of power instead of the first source of power thus leading to back current flow reaching the input of the first source of power.

In another embodiment, the controller is configured to determine whether the device operates in the second operation mode and/or the first power supply unit is unable to supply power to the ICC; and, based on said determination, to control operation of the power pin as a power input pin or as a power output pin, and/or to control the opening or closing of the circuit breaking device.

In yet another embodiment, the device operating in the second operation mode is determined based on information obtained by the controller from a central processor of the device.

If necessary, wherein the first power supply unit being unable to supply power to the ICC is determined by monitoring a current flow entering the power pin when the power pin is configured to operate in the first operation mode of the device.

In accordance with an embodiment of the proposed solution, the first power supply unit is considered to be unable to supply power to the ICC if the current flow entering the power pin during a given period of time when the power pin is configured to operate in the first operation mode of the device, is below a given threshold.

BRIEF DESCRIPTION OF THE DRAWINGS

A more complete understanding of the proposed solution may be obtained from a consideration of the following description in conjunction with the appended drawings, in which.

DETAILED DESCRIPTION OF EMBODIMENTS

Figure 1:
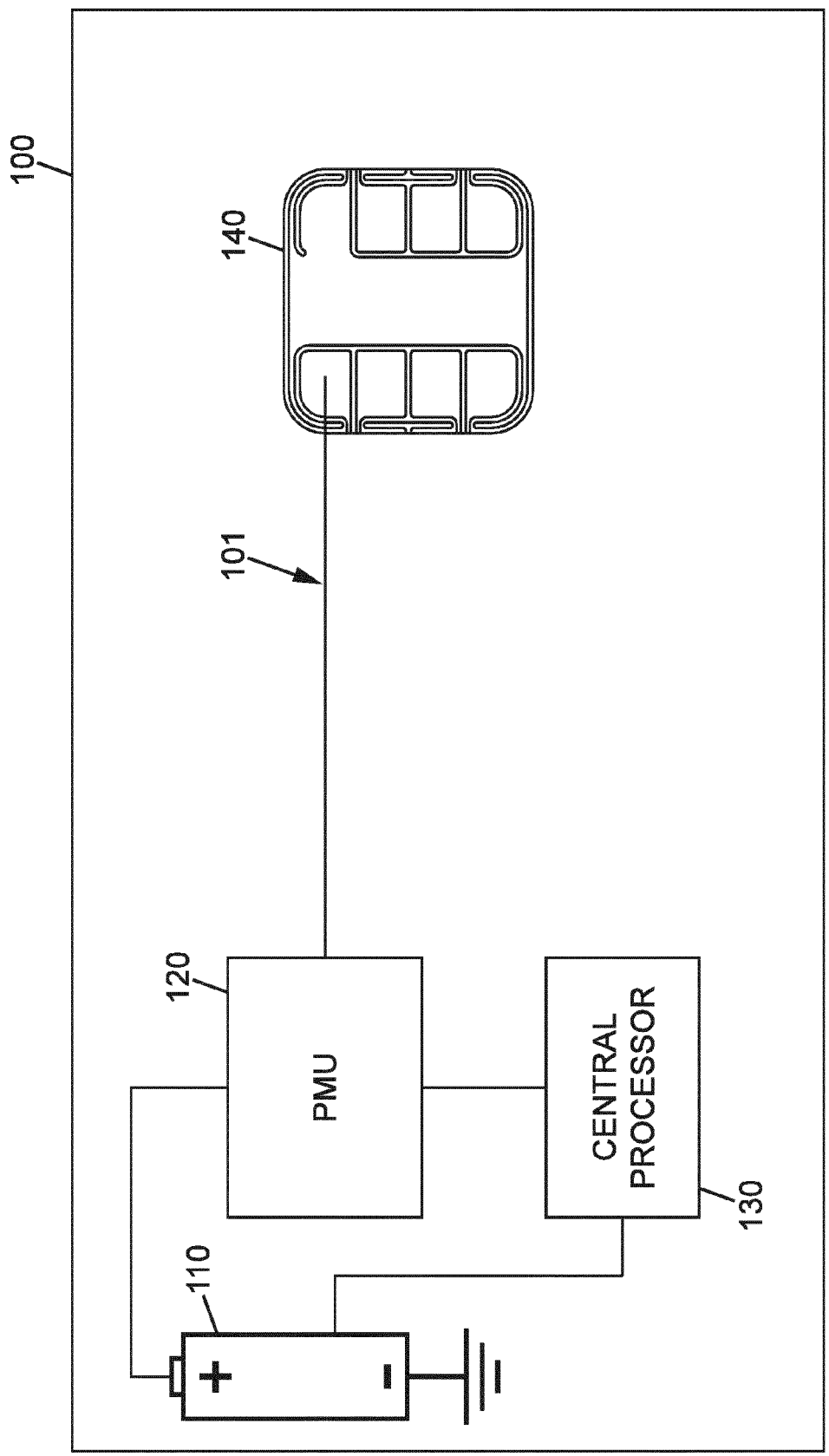
FIG. 1 is a block diagram illustrating prior art power system for supplying an ICC.

FIG. 1 is a block diagram illustrating prior art power system adapted to supply power to an ICC 140.

Referring to FIG. 1, there is shown therein a wireless device 100 comprising a battery 110, a first power supply unit 120, a central processor 130 and a first power path 101. The central processor 130 controls overall operation of the wireless device 100, the latter having at least some of the following functionalities: management of incoming and outgoing phone call, management of voice communication including speech data acquisition/restitution, encoding/decoding, modulating/demodulating, transmitting/receiving, and so on.

The processor 130 may be integrated in e.g. the digital baseband processor or may be a discrete, e.g. dedicated processor, microcontroller, or the like. The first power supply unit 120, which may be a power management unit or at least a part thereof, is responsible for managing the supply of power from the battery 110 to the ICC 140 through the first power path 101. The battery 110 may be, for instance, the main source of energy of the wireless device 100 circuitry and subsystems, or an additional, e.g. dedicated power storing device.

Depending on the level of power available in the battery 110, the wireless device 100 is set into a particular one of a plurality of operation modes.

Generally, at least three modes can be provided as follows: a "Full Power mode", a "Low Power mode" and a "Battery OFF mode".

"Full Power mode" and "Low Power mode" both correspond to what will be referred to as a first operation mode in what follows, while "Battery OFF mode" corresponds to what will be referred to as a second operation mode.

For instance, "Full Power mode" applies when the wireless device 100 is switched on and all the functionalities are made available to the user.

"Low Power mode" applies when the wireless device 100 is in an energy saving mode or is switched off with the battery 110 still containing a low residual power. In this mode, all the functionalities of the wireless device 100 are shut down, except the clock module and some few other functions. The wireless device may be put in this mode, either by the user or automatically, for instance when the available power is below a first threshold of the battery 110.

In some embodiments, "Battery OFF mode" applies when the battery 110 of the wireless device 100 is discharged or dismounted whereby no functionalities are available at all.

The proposed solution addresses situations when the device is in the latter mode.

In secure NFC applications, the UICC may be utilised as a Secure Element (SE) to hold sensitive information used by the device. Unfortunately, existing UICC power supply systems readily available to application designers are not adapted to serve the specific needs of the NFC SE (NFC Secure Element).

In fact, unlike the UICC, the NFC SE is designed to run even when the wireless device 100 is in a battery-Off mode.

Figure 2:
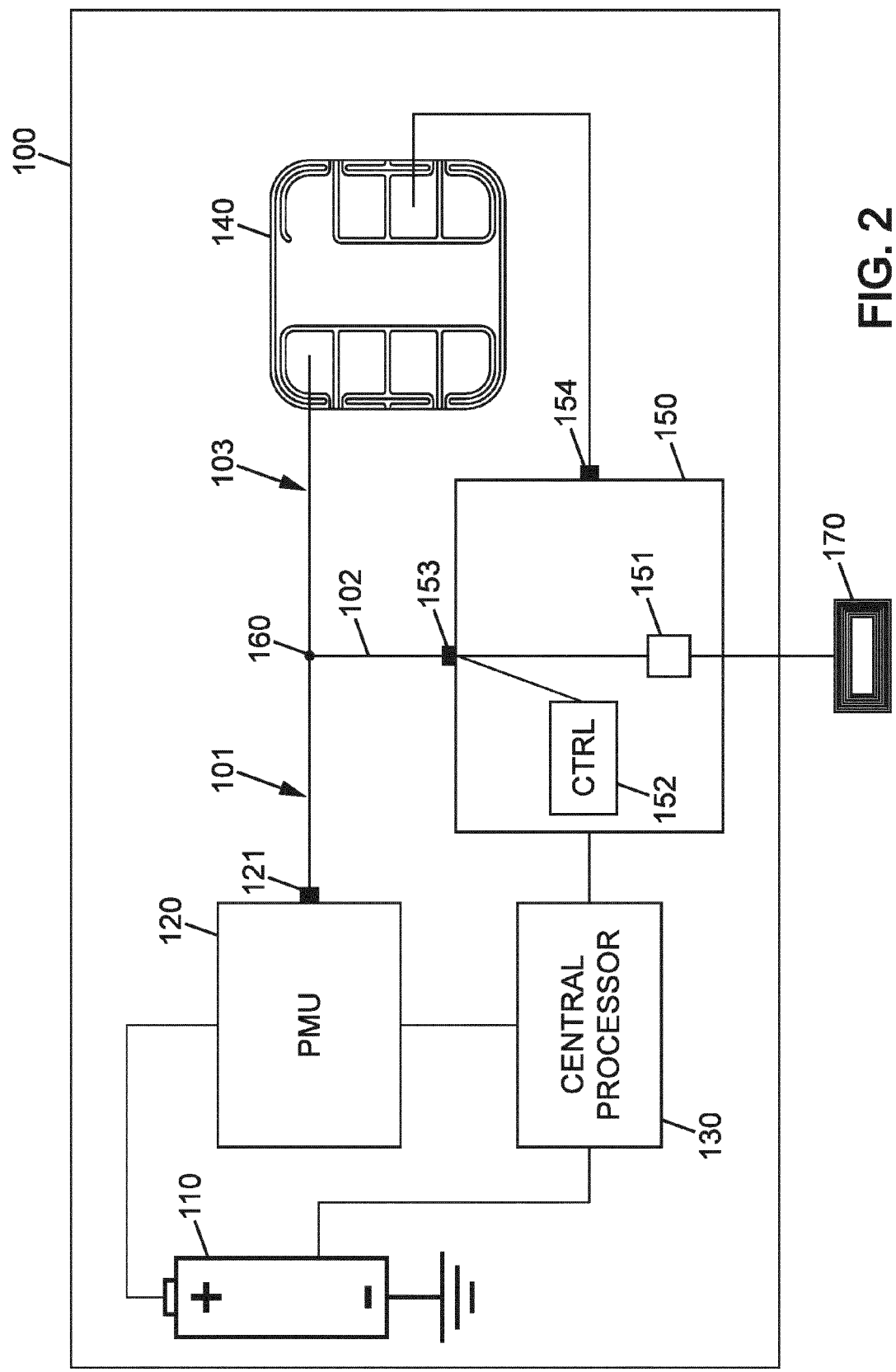
FIG. 2 is a block diagram illustrating an exemplary implementation of the proposed solution.

FIG. 2 is a block diagram illustrating an exemplary implementation of the proposed solution to that problem.

Referring to FIG. 2, there is shown therein the wireless device 100 of FIG. 1 further including a circuit 150. The circuit might be an NFC integrated circuit and is connected to the central processor 130. The circuit comprises a controller 152, a second power supply unit 151, a power pin 153 and a data communication pin 154.

In the shown embodiment, the communication pin 154 is connected to the ICC 140 in order to enable data and control exchange, for instance by using a protocol such as SWP (Single Wire Protocol).

The controller 152 is configured to operate the power pin 153, the latter being also connected to the second power supply unit 151 and to a connection point 160 between the first power path 101 and a second power path 102. The second power supply unit 151 is responsible for managing the power supply from a near field communication antenna 170 to the power pin 153.

In this scenario, the ICC 140 is supplied with power from the first power supply unit 120.

In the case where the wireless device 100 is in the first operation mode, that is to say in the "Full Power mode" or "Low Power mode" of the above mentioned example, the power pin 153 is configured to operate as a power input pin. In such configuration of pin 153, power coming from the first power supply unit 120 may enter the circuit 150, via the connection point 160 and through the power path 102 and the power pin 153 without damaging the circuit 150.

In this scenario, the ICC 140 is supplied with power from the first power supply unit 120.

In this scenario, as well, a power pin 121 attached to the first power supply unit 120 may not have any impact on the power coming from the first power supply unit 120.

In the case where the wireless device 100 is in the second operation mode, that is to say in the "Battery OFF mode" of the above mentioned example, the power pin 153 is configured to operate as a power output pin. In such configuration of pin 153, power coming from the near field communication antenna 170, by induction for instance, may be carried to the connection point 160 by the second power supply unit 151 through the power pin 153 and the power path 102. The power coming from the near field communication antenna 170 may then flows through the power path 103.

In this scenario, the ICC 140 is supplied in power by the second power supply unit 151.

The power coming from the near field communication antenna 170 may also be flows through the power path 101.

This would correspond to back current flow that may enter the first power supply unit 120. The first power supply unit 120 is adapted to withstand the ingress of this unwanted power thanks to the power pin 121 thus preventing any damage of the first power supply unit 120. For instance the power pin 121 may comprise at least a diode to prevent the back current flow into the first power supply unit 120, for instance, while the wireless device 100 is in the second operation mode, that is to say in the "Battery OFF mode" of the above mentioned example.

Figure 3:
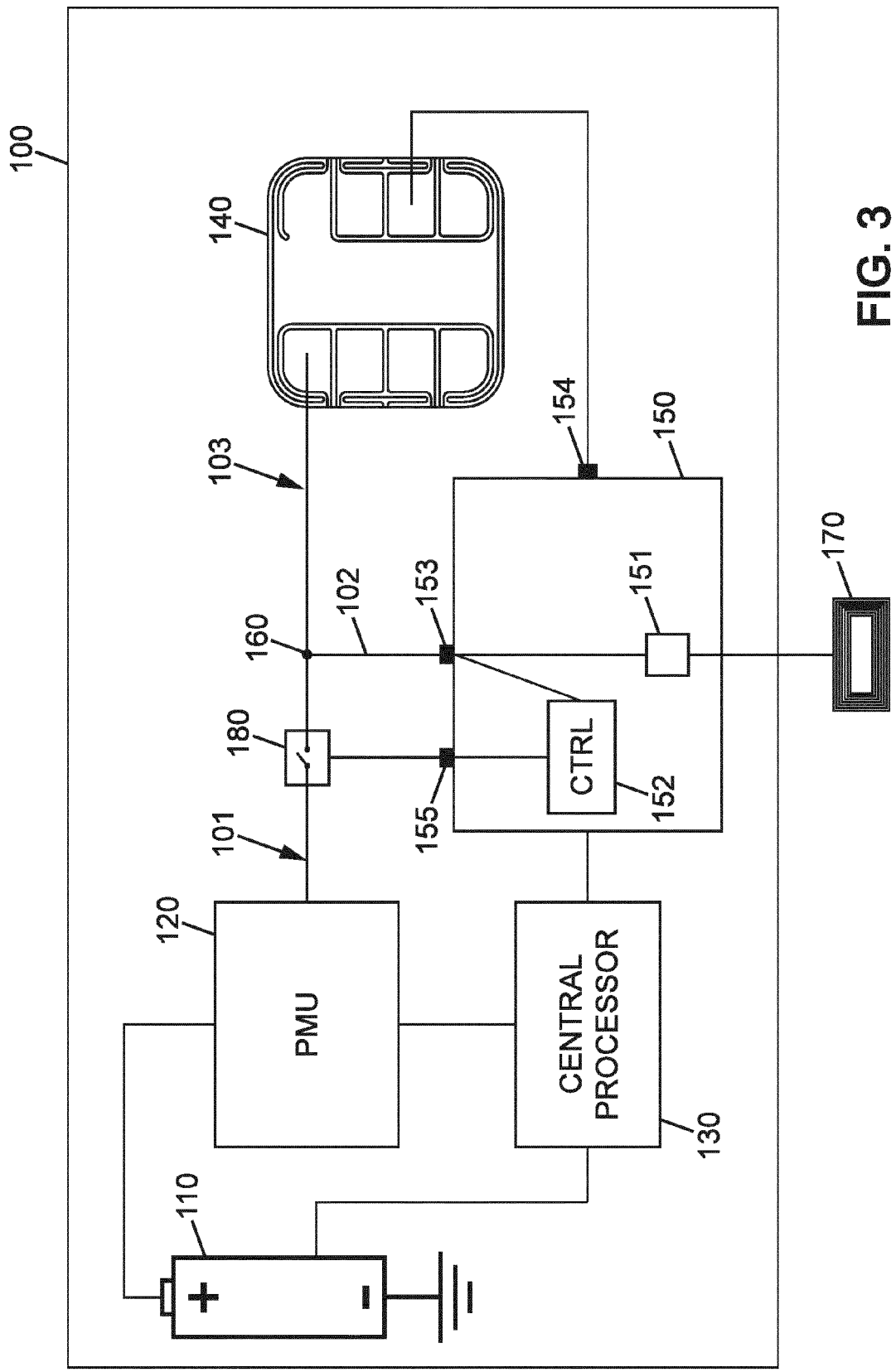
FIG. 3 is a graph illustrating an example of implementation of the proposed solution.

FIG. 3 is a graph illustrating an example of implementation of the proposed solution.

Referring to FIG. 3, there is shown therein the wireless device 100 of FIG. 2 further including a control pin 155 on the circuit 150 and a circuit breaking device 180 arranged in the first power path 101. The control pin 155 is connected to the controller 152 and to the circuit breaking device 180. The circuit breaking device may be located between the first power supply unit 120 and the connection point 160. The controller 152 is configured to operate the circuit breaking device 180 through the control pin 155.

In case where the wireless device 100 is in the first operation mode, that is to say in the "Full Power mode" or "Low Power mode" of the above mentioned example, the power pin 153 is configured to operate as a power input pin. In such configuration of pin 153, power coming from the first power supply unit 120 may enter the circuit 150, via the connection point 160 and through the power path 102 and the power pin 153 without damaging the circuit 150.

The controller 152 may also operate at the same time the circuit breaking device 180 to let the power normally flow over the first power path 101 while the wireless device 100 is in the "Full Power mode" or in the "Low Power mode".

In this scenario, the ICC 140 is supplied in power by the first power supply unit 120.

In case where the wireless device 100 is in the second operation mode, that is to say in the "Battery OFF mode" of the above mentioned example, the power pin 153 is configured to operate as a power output pin. In such configuration of pin 153, power coming from the near field communication antenna 170, by induction for instance, may be carried to the connection point 160 by the second power supply unit 151 through the power pin 153.

In this scenario, the ICC 140 is supplied in power by the second power supply unit 151.

In such scenario, the controller 152 may also operate at the same time the circuit breaking device 180 to cut off the first power path 101 in order to prevent back current flow from the second power supply unit 151 in the first power supply unit 120 via the connection point 160 while the wireless device 100 is in a "Battery OFF mode".

In fact, the power supply unit 101 of legacy power system such as the one illustrated in FIG. 1 may not be able to withstand the ingress of back current flow. Therefore, the circuit breaking device 180 aims at shielding the first power supply unit 120 against potential severe damages.

Referring to both FIGS. 2 and 3, in some embodiments the controller 152 is capable of determining whether the first power supply unit 120 is unable to supply power to the ICC, that is to say in the "Battery OFF mode".

Based on that determination, the controller 152 may operate the power pin 153 to selectively act as power input pin or as power output pin. The controller 152 may, at the same time, operate the circuit breaking device 180 to let the current flow normally on the first power path 101 or to cut off the first power path 101.

In one embodiment, the knowledge of the first power supply unit 120 being in the second operation, that is to say in the "Battery OFF mode" may be obtained from the central processor 130 to which the circuit 150 is connected to. The central processor 130 may, for instance, give indication to the controller 152 about the wireless device 100 state or about the amount of residual power available in the battery 110 of the wireless device 110. At least the latter information and some others may be manipulated by the controller 152 to determine the subsequent operations to trigger.

In another embodiment, the controller 152 may determine whether the first power supply unit 120 is unable to supply power to the ICC, that is to say in the "Battery OFF mode" by monitoring the current flow entering the power pin 153 while being configured to operate as a power input pin. Hence, for instance, if during a given period of time there is no current flow entering the power pin 153, the controller 152 can deduce that the first power supply unit 120 is in a "Battery OFF mode".

Figure 4:
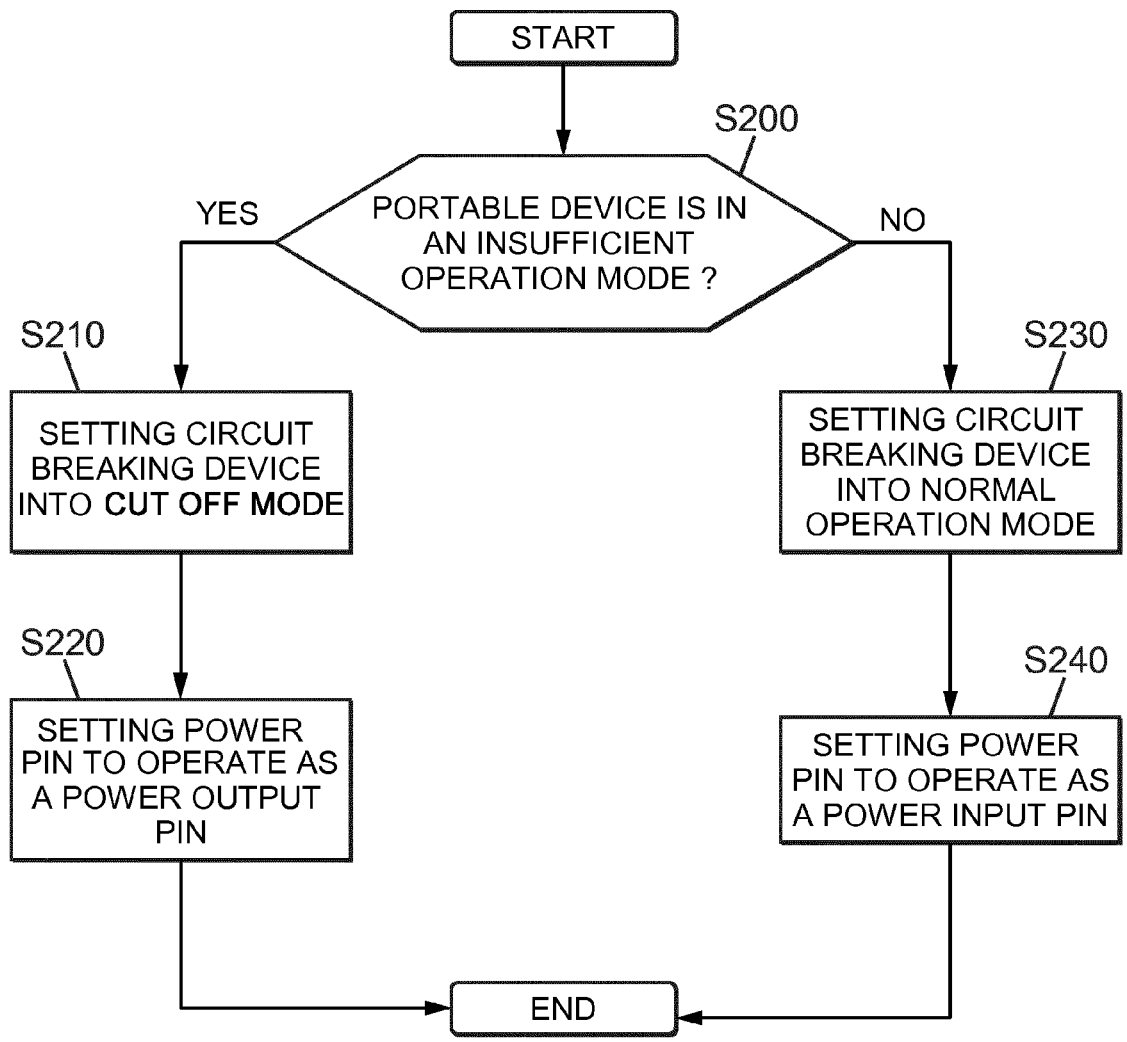
FIG. 4 is a flow chart illustrating embodiments of the proposed method.

FIG. 4 is a flow diagram illustrating embodiments of the proposed method consistent with the embodiment of the wireless device 100 already described above with FIG. 3. Depending on the embodiment, additional steps may be added, others removed, and the ordering of the steps rearranged.

Referring to FIG. 4, in step S200, a test is performed to establish whether the wireless device 100 is in a second operation mode. The second operation mode being, for instance, the "Battery OFF mode" as already described beforehand.

If the wireless device 100 is in the second operation mode, subsequently in a step S210, the circuit breaking device 180 is set into a cut off mode as already described in FIG. 3.

That being so, in a step S220, the power pin 153 is set to operate as a power output pin as already described in FIG. 3. After that, the algorithm would stop.

On the other hand, if the wireless device 100 is not in the second operation mode, that is to say in the in the first operation mode, then in a step S230, the circuit breaking device 180 is set into normal operation mode as already described in FIG. 3 such that the current would normally flow through the first power path 101.

That being so, in a step S240, the power pin 153 is set to operate as a power input pin as already described in FIG. 3. After that, the algorithm would stop.

In the claims, the word "comprising" does not exclude other elements or steps, and the indefinite article "a" or "an" does not exclude a plurality. A single unit may fulfil the functions of several items recited in the claims. The mere fact

The invention claimed is:

1. A circuit for supplying power to an integrated circuit card, ICC, of a wireless device comprising a first power supply unit adapted to supply power to the ICC through a first power path in a first operation mode of the device while being unable to supply power to the ICC in a second operation mode of the device, the circuit comprising:
   a second power supply unit;
   a power pin connected to the second power supply unit and configured to selectively operate as a power input pin or as a power output pin, and adapted to be selectively connected to the first power supply unit of the device through a second power path of the device or to the ICC through a third power path of the device, respectively;
   a controller configured to cause the power pin to operate as a power input pin in the first operation mode of the device whereby the second power supply unit is loaded with power from the first power supply unit through the power pin and the second power path of the device, or as a power output pin in the second operation mode of the device whereby power is supplied to the ICC from the second power supply unit through the power pin and the third power path of the device,
   wherein the controller is configured to
      determine whether the device operates in the second operation mode and/or the first power supply unit is unable to supply power to the ICC, and
      based on said determination, control operation of the power pin as a power input pin or as a power output pin, and/or to control the opening or closing of a circuit breaking unit,
   wherein
      (a) the device operating in the second operation mode is determined based on information obtained by the controller from a central processor of the device, or
      (b) the first power supply unit being unable to supply power to the ICC is determined by monitoring a current flow entering the power pin when the power pin is configured to operate in the first operation mode of the device.

2. The circuit of claim 1, further comprising a control output pin connected to the controller and adapted to be connected to the circuit breaking unit of the device located in the first power path between the first power supply unit and a connection point between the first power path on one side, and the second and third power path on the other side; and
   wherein the controller is configured to control the opening of the circuit breaking unit through the control pin so as to prevent back current flow from the second power unit to the first power supply unit in the second operation mode of the device.

3. The circuit of claim 1, wherein the first power supply unit is considered to be unable to supply power to the ICC if the current flow entering the power pin during a given period of time when the power pin is configured to operate in the first operation mode of the device, is below a given threshold.

4. A wireless device comprising:
   an integrated circuit card, ICC;
   a first power supply unit with a power pin adapted to withstand input current flows without suffering damage, adapted to supply power to the ICC through a first power path in a first operation mode of the device while being unable to supply power to the ICC in a second operation mode of the device; and,
   a circuit adapted to supply power to the ICC in the second mode of operation, the circuit comprising
      a second power supply unit;
      a power pin connected to the second power supply unit and configured to selectively operate as a power input pin or as a power output pin, and adapted to be selectively connected to the first power supply unit of the device through a second power path of the device or to the ICC through a third power path of the device, respectively;
      a controller configured to cause the power pin to operate as a power input pin in the first operation mode of the device whereby the second power supply unit is loaded with power from the first power supply unit through the power pin and the second power path of the device, or as a power output pin in the second operation mode of the device whereby power is supplied to the ICC from the second power supply unit through the power pin and the third power path of the device,
   wherein the controller is configured to
      determine whether the device operates in the second operation mode and/or the first power supply unit is unable to supply power to the ICC, and
      based on said determination, control operation of the power pin as a power input pin or as a power output pin, and/or to control the opening or closing of a circuit breaking unit,
   wherein
      (a) the device operating in the second operation mode is determined based on information obtained by the controller from a central processor of the device, or
      (b) the first power supply unit being unable to supply power to the ICC is determined by monitoring a current flow entering the power pin when the power pin is configured to operate in the first operation mode of the device.

5. A method of supplying power to an integrated circuit card, ICC, of a wireless device comprising a first power supply unit, the method comprising:
   in a first operation mode of the device, supplying power to the ICC from the first power supply unit through a first power path coupling the first power supply unit to the ICC, and loading power from the first power supply unit into a second power supply unit through a second power path;
   in a second operation mode of the device wherein the first power supply unit is unable to supply power to the ICC, supplying power to the ICC from the second power supply unit through a third power path of the device coupling the second power supply unit to the ICC; and
   determining whether the device operates in the second operation mode and/or the first power supply unit is unable to supply power to the ICC, and based on said determination, controlling the operation of the power pin as a power input pin or as a power output pin, and/or controlling the opening or closing of a circuit breaking unit,
   wherein
      determining whether the device operates in the second operation mode is based on information obtained from a central processor of the device, or
      determining whether the first power supply unit is unable to supply power to the ICC comprises monitoring a current flow entering the power pin in the first operation mode of the device.

6. The method of claim 5, wherein the circuit breaking unit is located in the first power path and prevents back current flow from the second power unit to the first power supply unit in the second operation mode of the device.

7. The method of claim 5, wherein the first power supply unit is considered to be unable to supply power to the ICC when the current flow entering the power pin during a given period of time in the first operation mode of the device, is below a given threshold.

\* \* \* \* \*